Patented Nov. 28, 1950

2,532,222

UNITED STATES PATENT OFFICE 2,532,222

ARYL ESTERS OF 4-CHLOROBENZENE SULFONIC ACID

Edgar C. Britton and Harold R. Slagh, Midland, Mich., assignors to The Dow Chemical Company, Midland, Mich., a corporation of Delaware No Drawing. Application October 31, 1949, Serial No. 124,734

3 Claims. (Cl. 260—456)

This invention is concerned with the aryl esters of 4-chlorobenzene sulfonic acid having the formula

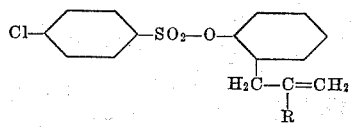

wherein R is hydrogen or methyl. These new ester compounds are oily liquids or crystalline solids somewhat soluble in many organic solvents and substantially insoluble in water. They are of value as toxic constituents of parasiticide compositions.

The new compounds may be prepared by reacting 4-chlorobenzene sulfonyl chloride with an alkali metal salt of 2-allylphenol or 2-(2-methallyl)phenol in water as reaction solvent. Substantially equimolecular proportions of the reactants have been found to give the ester product in good yield. In practice, the phenolate employed is preferably the sodium salt and may be prepared by reacting substantially equimolecular proportions of sodium hydroxide and 2-allylphenol or 2-(2-methallyl)phenol in water. The reaction between the phenolate and 4-chlorobenzene sulfonyl chloride may be accomplished by adding either reactant portionwise to the other.

In another mode of operation, the reaction may be conveniently accomplished by adding portionwise an aqueous solution of sodium hydroxide to a mixture of 4-chlorobenzene sulfonyl chloride and 2-allylphenol or 2-(2-methallyl)phenol.

The above operations are carried out with stirring and at a temperature of from 20° to 100° C. The reaction is somewhat exothermic, and temperature control is maintained by the rate of addition of the reactants, as well as by the addition and subtraction of heat, if required.

Upon completion of the reaction, the crude mixture is cooled and the desired product separated by filtration or decantation of the reaction solvent. This product may be further purified as by repeated washing with water or recrystallization from organic solvents.

EXAMPLE 1

*2-allylphenyl ester of 4-chlorobenzene sulfonic acid*

20 grams (0.5 mole) of sodium hydroxide dissolved in 340 milliliters of water was added portionwise over a period of 30 minutes and with stirring to a mixture of 67 grams (0.5 mole) of 2-allylphenol and 105.5 grams (0.5 mole) of 4-chlorobenzene sulfonyl chloride. The addition was carried out at a temperature of from 60° to 70° C., and the resulting mixture maintained at this same temperature for one hour to complete the reaction. The crude mixture was then cooled to room temperature and filtered to obtain the 2-allylphenyl ester of 4-chlorobenzene sulfonic acid as a white crystalline residue. The latter was washed with water and recrystallized from ethanol to obtain the substantially pure ester melting at 54° to 56° C.

EXAMPLE 2

*2-(2-methallyl)phenyl ester of 4-chlorobenzene sulfonic acid*

20 grams (0.5 mole) of sodium hydroxide dissolved in 340 milliliters of water was added portionwise over a period of 30 minutes and with stirring to a mixture of 74 grams (0.5 mole) of 2-(2-methallyl)phenol and 105.5 grams (0.5 mole) of 4-chlorobenzene sulfonyl chloride. The addition was carried out at a temperature of from 60° to 70° C., and the resulting mixture maintained with stirring at 65° to 75° C. for one hour to complete the reaction. The reaction vessel and content were then cooled to room temperature; the reaction mixture separating into aqueous and oil layers. The latter was separated to obtain the 2-(2-methallyl)phenyl ester of 4-chlorobenzene sulfonic acid as an oily liquid having a refractive index $n/D$ of 1.5517 at 25° C. and a specific gravity of 1.841 at 25°/25° C.

These compounds have been found effective as insecticides and may be employed in dosages required for insect control with negligible injury to the foliage of plants. In this use the compounds are preferably employed in combination with an inert carrier such as water or other liquid diluent. The compounds may also be dispersed on a finely divided solid and employed as a dust mixture. Such dust mixture, if desired, may be suspended in water with the aid of a wetting agent, and the suspension applied to plants in the form of a spray.

A representative composition found valuable for the control of agricultural pests is the following:

| Composition | Parts by weight |
|---|---|
| 2-(2-methallyl)phenyl ester of 4-chlorobenzene sulfonic acid | 1 |
| Dimeric alkylated aryl polyether alcohol (Triton X-155) | 0.4 |
| Xylene | 2.6 |
| Water | 829 |

The foregoing materials were mixed together to produce a spray composition containing 1 pound of toxicant per 100 gallons of solution. When this composition was applied against two-spotted spider mite adults on a stand of mature cranberry bean plants, an 85 per cent kill of the organism was obtained.

We claim:

1. An aryl ester of 4-chlorobenzene sulfonic acid having the formula

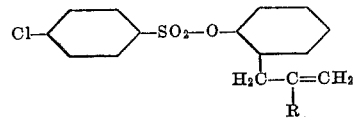

wherein R is a member of the group consisting of hydrogen and methyl.

2. The 2-allylphenyl ester of 4-chlorobenzene sulfonic acid.

3. The 2-(2-methallyl)phenyl ester of 4-chlorobenzene sulfonic acid.

EDGAR C. BRITTON.
HAROLD R. SLAGH.

No references cited.